June 16, 1936.   E. C. BULLARD   2,044,494
METALWORKING
Filed Jan. 31, 1935   3 Sheets-Sheet 1

INVENTOR.
EDWARD C. BULLARD
BY
A. T. Sperry
ATTORNEY

June 16, 1936.  E. C. BULLARD  2,044,494
METALWORKING
Filed Jan. 31, 1935    3 Sheets-Sheet 2

INVENTOR.
EDWARD C. BULLARD
BY
ATTORNEY

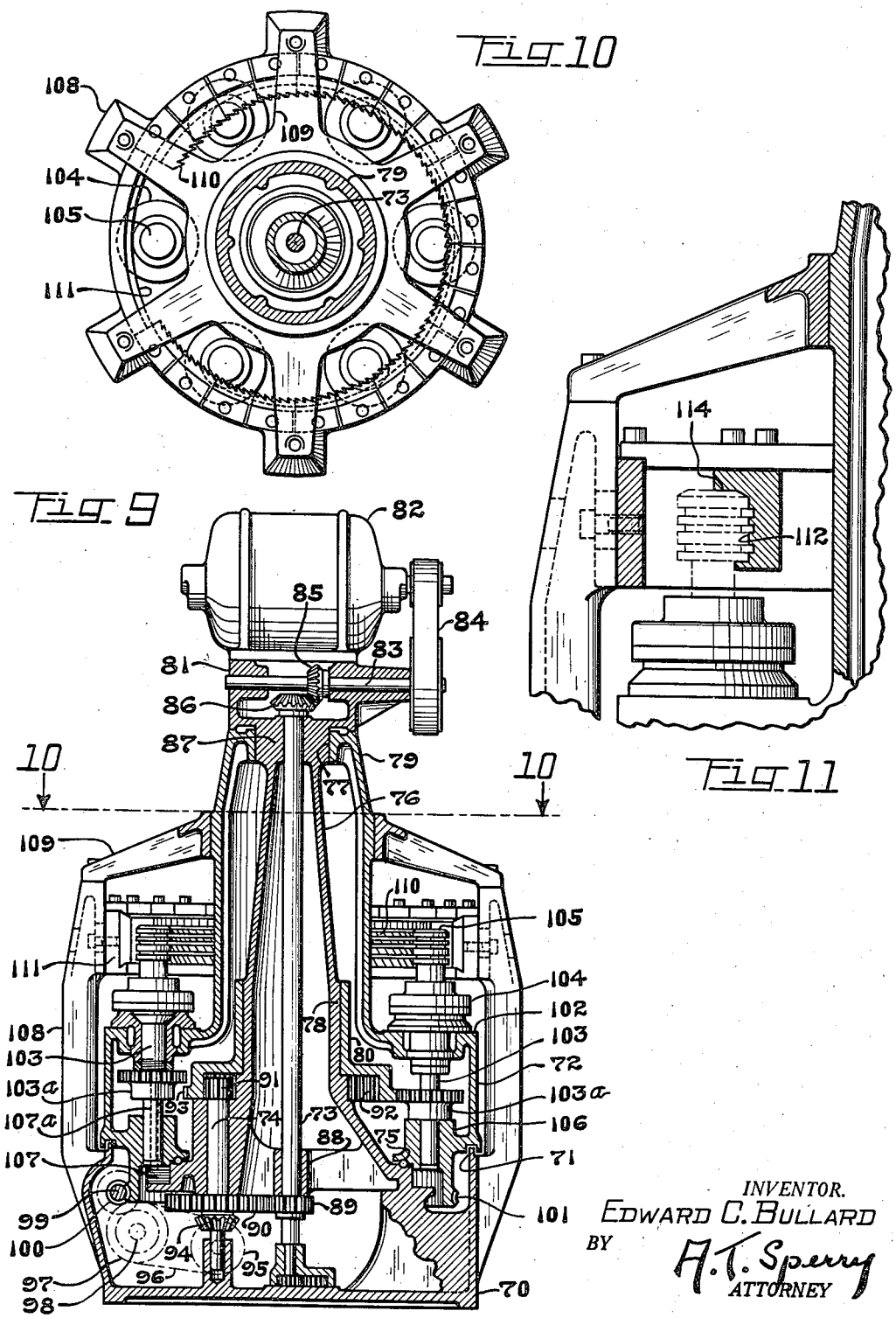

Patented June 16, 1936

2,044,494

UNITED STATES PATENT OFFICE 2,044,494

METALWORKING

Edward C. Bullard, Fairfield, Conn., assignor to The Bullard Company, a corporation of Connecticut Application January 31, 1935, Serial No. 4,207

41 Claims. (Cl. 82—1)

This invention relates to a method of turning metal and a tool therefor. Broadly speaking, the method is one in which the work is rotated on its own axis at cutting speed, while a relative movement between work and tool subjects the surface to be turned to the shearing or skiving action of one or more blades of a tool. The tool consists of a plurality of blades suitably formed and disposed upon a support and adapted to have the cutting action shift relatively slowly along each blade and from one blade to the next.

Turning is sometimes, but incorrectly, spoken of as metal cutting, which implies an actual shearing action as distinct from "splitting" which forces material apart along its grain structures with a wedging action and which is likewise distinct from sawing in which the particles are actually pushed or wedged off. Single point tools act in this wedging manner. The chips from such tools are a series of pieces scraped or wedged off the main body and are badly deformed and crushed.

With the advent of production turning, there have been several factors which have assumed utmost importance, namely:

1. Length of tool life without regrinding.
2. Maintenance of smooth surface finish and accurate dimensions.
3. The economical removal of a large amount of material in a short time with the least consumption of power, and without sacrificing tool life and surface finish. With these factors in mind, this invention presents an entirely new type of shear cutting tool and a method and apparatus, suitably developed for the most efficient use of this tool.

Metal machining methods, heretofore in commercial success, may be divided into two classes, each of which have limitations and power extravagances, which the present method overcomes. These two methods, which have been in general use, may be referred to as, first: methods in which either the work, or the tool, stands still, while the other moves, as exemplified in planing and broaching. In planing, the single point tool is held stationary and against it the work moves in a series of parallel passes, each of which gouge off a line of chips, each line cooperating with the next adjacent line to finally produce a flat surface reduced from the original in thickness. In broaching, the work is held stationary, while a tool, having a series of blades, is moved over the work surface; the successive blades extending a little deeper in the work and each blade gouging from the entire surface an amount of material commensurate with the depth of the blade. In both of these cases, the characteristic of the cut requires heavy cutting action and the blade, or blades, are subjected to a continuous cutting strain and the continuous deleterious action of the cutting heat evolved.

The second previously used method is characterized by the movement of both the work and the tool. This is exemplified in lathe work and in milling work. In lathe work, a single point tool reduces a concentric surface by continuously plowing chips from around the surface in a close spiral of overlapping, wedging gouges. Such action leaves a characteristic revolution mark and subjects the tool point to continuous wear and heat. In milling, a slowly moving work surface is acted upon by a fast revolving series of concentric blades, each blade acting upon a single surface area from which it removes a chip. The next blade acting on the next adjacent area and so on until the entire surface is reduced. Both of these methods are limited to a definite depth of cut per pass of the tool.

The milling method performs a cutting action more of a shear type and more compatible with efficient cutting and nicety of finish, while the broach is relatively unlimited as to the depth of cut by a single pass of a tool since that instrument uses successive blades each of which cut deeper into the work. Applicant's method is one which combines this advantage of the broach with regard to depth of cut and the shear cutting action of the mill. This scientifically developed method and tool acts as a plow, shearing the metal chip from the work and pushing it to one side, allowing the cutting edge to advance relative to the work. The cutting angle is such that the chip slips instead of crumbles, and it flows from the work in a continuous, spirally-wound ribbon. Thus, this method includes all the advantages of the various prior known methods and avoids the inherent disadvantages thereof. The method may, therefore, be referred to as rotary-broaching.

A general object, is therefore, to provide a method and tool for achieving the desiderata above outlined, among which may be included the following: The insurance of shearing action to produce a smooth finished surface; the avoidance of limitations, as to depth of cut in any one tool pass; the achievement of maximum power efficiency and tool life and economy of operation both as to capital investment and operating costs.

Other more specific objects are to provide a method and tool which, by a single pass, will produce a plurality of cuts, and it is part of the inventive concept to provide either for a plurality of material removing, skiving cuts across the work, by a single pass, and/or for a plurality of finishing cuts.

Another object is to provide a method and tool by which extended cutting surfaces successively bring into action contiguous portions of the cutting edges so that the cutting action will pass along the surface at a suitable speed to avoid overheating or otherwise injuriously affecting any particular portion of the surface.

The invention also provides for delivering chips as a continuous shaving from the cutting edge, thus avoiding distortion of the chips and the consequential energy loss. The invention also avoids or reduces to a minimum inaccuracies in cutting action due to vibration or chattering of the apparatus.

A further object is to provide a method and tool in which complicated tool moving means and necessary complicated feed works therefor are done away with so as to provide a device in which simplicity of construction is combined with particular efficiency in operation. It will be understood that in connection with this feature of the invention, the necessary time losses for tooling the machine are almost wholly eliminated.

Another object is to provide a method and tool which effectively utilizes substantially unvarying amounts of power, so that sudden or unusual strains upon the cutters, the apparatus, or its source of power, are avoided.

Other objects include the provision of a method and tool which will be effective over a long period of usefulness, which will have exceptionally high efficiency, require minimum power for maximum removal of material and which is particularly simple in construction and operation and readily adaptable to varying conditions.

Other objects and advantages of the invention will appear from a detailed explanation of several forms of the same which will now be given in conjunction with the drawings. It will be understood that the embodiments of the invention herein disclosed are merely some of the many examples, which might be made, illustrating the inventive concept and that numerous changes and modifications, and the full use of equivalents, may be resorted to in carrying out the invention and for adapting it for a variety of special types of work.

The present invention is particularly concerned with the adaptation of its principles to the turning of the harder metals, such as steel and iron. Various attempts have been made heretofore to subject soft metals, such as brass, to the successive turning action of several blades, but these have never proved successful even at slow speeds and in connection with the soft metals. No attempt has been made, prior to this invention, so far as I am aware, to overcome the numerous difficulties encountered in applying these principles to high speed operations upon the harder metals. Among the reasons for the unsatisfactory results obtained from the prior efforts was the failure to provide any clearance angle for the cutting edge with the result that friction, and thus over-heating and burning out of the tool edge, developed and the unused tool surface was subjected to destructive abrasion. Another cause of the failure of the early, abandoned efforts was the lack of a proper rake angle which, alone or in combination with the clearance angle, has an important bearing upon the efficiency and effectiveness of this type of cutting action. Experimental work has shown that it is absolutely necessary to provide appropriate rake and clearance angles. The invention further contemplates the arrangement of the cutting blades at a suitable angle to the work axis in order that the shearing action referred to may properly take place. It must be borne in mind that the setting of the cutting edge at an angle with the work axis affects both the rake and clearance angles, and the actually effective rake and clearance angles depend upon the angle at which the blade is set.

This application is a continuation in part of applicant's application, Serial Number 556,387, filed August 11, 1931. The subject matter not shown in that application was originally presented in my abandoned application, Serial Number 556,386, filed August 11, 1931 and the continuation thereof which resulted in my patent, #1,899,608, within two years of the issue of which this application is filed. The subject matter in this application, which has a basis in the latter two mentioned applications, has never been abandoned therein, but has been cancelled therefrom for the purpose of facility in prosecution procedure.

In the drawings:

Fig. 9 is a sectional side elevation of a different tool and apparatus also used for carrying out the method.

Fig. 10 is a sectional plan taken on the lines 10—10 of Fig. 9.

Fig. 11 is a detailed view showing a modification of the apparatus in Fig. 9.

Figure 1:
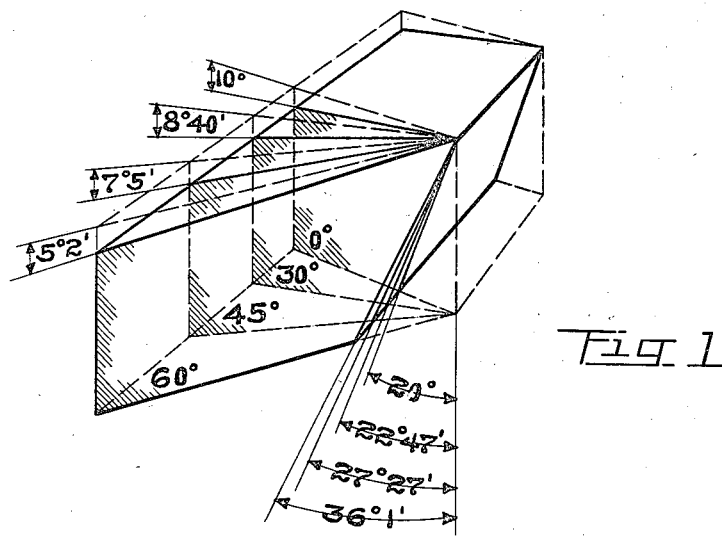
Fig. 1 is a diagrammatic view illustrating the relation of clearance and rake angles to the angle of incidence of the tool blade to the work.

Returning now to the dependency of the effective rake and clearance angles upon the angle of incidence of the tool, i. e., the angle at which the tool blade approaches the work surface, reference may be had to the diagram, Fig. 1, in which planes have been struck through the tool block at angles of 0°, 30°, 45° and 60° to the transverse axis of the blade. If we assume that the cutting edge of the blade is tilted at these angles of incidence to the axis of the work, it will be apparent that the planes indicated will be perpendicular to the work axis. Thus when the cutting edge is parallel with the work axis there is a zero angle of incidence and the 0° plane will be perpendicular to the work axis, while when the cutting edge is at 60° to the work axis there will be a 60° angle of incidence and the 60° plane will lie perpendicular to the work axis.

The tool is indicated as being formed from a rectangular bar of tool stock which is ground to provide a normal rake angle of 20° and a clearance angle of 10°, as shown in the 0° plane. As the angle of the direction of feed or angle of incidence increases, the effective clearance angle decreases and the effective rake increases, the latter change being at a greater rate than the former. While the angularity of the tool to the work increases, the thickness of material between the rake and clearance surfaces diminishes, thus presenting, in effect, an increasingly sharper shearing edge. It will be noted at the same time that the mass of material in line with the direction of cut, which is measured along a diagonal from the cutting edge to the lower back edge of the blade increases with the angle of incidence so that the mass of material backing the cutting strain increases as the angle increases. The following table shows the relation of effective clearance and rake angles to various angles of incidence with a tool ground to normal 20° rake and 10° clearance angles:

| Angle of incidence | Effective rake | Effective clearance |
| --- | --- | --- |
| 0° | 20° | 10° |
| 30° | 22° 47′ | 8° 40′ |
| 45° | 27° 27′ | 7° 5′ |
| 60° | 36° 1′ | 5° 2′ |

Minor angles of incidence of the tool to the work have been found to be less feasible than a major angle especially for the smooth, efficient and low power consumption of high speed turning of hard materials. I have also found that when minor angles of incidence are employed, the desired shearing or skiving action is largely lost and is replaced by a wedging, chip deforming gouge from which large heat losses ensue and undue wear and strain follow. This results in increasing the normal power requirement and decreasing the smoothness of the finish.

Tests have shown that the most appropriate angle of incidence depends to a considerable extent upon the material hardness. For instance, with chrome nickel steel with a Brinell hardness of 207, an angle of from 50° to 60° has been found to work out the best. In such tests a ground or normal clearance angle of 10° and a normal rake angle of 20° were successfully employed. In any given situation conflicting factors must be considered and the angles adopted must be in the nature of a compromise and must be those which best meet the specific requirements as a whole. Thus to a large extent the angle of incidence is selected as the lowest angle which will insure the smooth sidewise slipping of the chip and will permit a true shearing or peeling action. It will be apparent that if too great an angle is adopted, approaching 90°, the width of the cut will be so reduced that the operation will become inefficient and the revolution marks will become pronounced. At the same time in working harder metals a relatively large angle should be adopted to reduce the width of the cut and thus avoid overburdening the machine and cutter. The kind of material being worked thus largely controls this consideration. However, the rake angle, also has its effect on chip discharge, the greater this angle, the more satisfactory is the chip discharge. However, an increase of the rake will reduce the material of the cutter between the rake and clearance surfaces and an excessive rake angle should, therefore, be guarded against.

A controlling factor in determining the requisite clearance angle is the relation between the rate of feed of the tool across the work and the speed of rotation of the work. In turning machines, regardless of whether movement is mutual between work and tool or is confined to one or the other of these elements, a spiral groove or revolution mark is made, the depth of which is determined by the tool setting while its pitch is determined by the ratio of the bodily relative feed between the tool and work to the speed of rotation of the work.

So as to relieve any one blade of the danger of becoming overheated and burned, due to taking too deep a cut, the improved cutter preferably consists of not one blade but a series of blades or cutting edges, each successive one set higher so as to remove a further amount of material. Therefore, it can be seen that if each blade removes fifteen thousandths of an inch from the work surface, it would require four blades, each successive one set .015″ higher than the preceding one to remove approximately $\frac{1}{16}$ inch of metal. In the present tool, the cutting edges are preferably arranged in accordance with a given formula, as will be explained, so as to have each successive cut coordinated with the preceding ones whereby the spiral ridge left by the action of the first cutter is wholly eliminated by the subsequent cutters, thereby leaving a finished, smooth surface.

Figure 2:
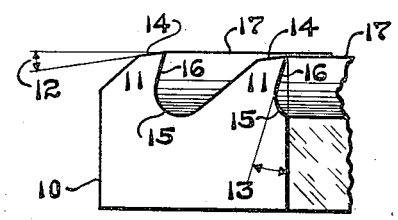
Fig. 2 is a detailed view of a preferred form of blade.

Referring now to Fig. 2, there is shown one preferred embodiment of the tool which, while bearing a general similarity to the tool diagrammatically illustrated in Fig. 1, varies therefrom in a number of particulars. By way of illustration, the tool consists of a base block 10 which is formed with a pair of blades 11, each of which has a suitable clearance angle of, say, 10°, measured at 12 and a rake angle of, say, 20°, measured at 13, it being understood that these angles are simply suggested for illustration and that their magnitudes may depart from the values herein specified to suit particular requirements. Their effective values will automatically vary, furthermore, in accordance with the angle of incidence of the tool. Behind the clearance surface 14, the forward blade slopes rearwardly and is developed info or merged with a curling surface 15 which extends into and meets the rake surface 16 of the rear blade. A similar relation is brought about between the rear blade of one pair and the front blade of another pair. By this construction of curl surface, the continuous long ribbon or fillet of metal removed by the blade edge 17 is curled so as to contribute to the ease of its discharge sidewise from the tool. The matter of chip discharge is a highly important feature of the invention and one upon which a great deal of its success and efficiency depend. By so constructing the blade as to accomplish rapid and easy chip disposal, the heat generation and power losses due to the mutilation or crumpling of the chip are avoided and the danger of the packing of the chips against the rake surface, whereby they would cause chattering and uneven work, is avoided.

Figure 3:
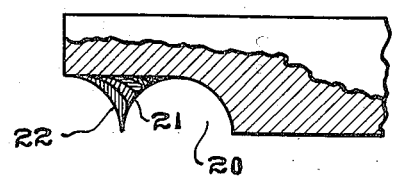
Fig. 3 is a magnified view of a work surface illustrating diagrammatically the relayed action of the successive tool blades resulting from a predetermined blade spacing.

While the invention in all of its aspects is not confined to the use of plural blade edges, such tools have been found advantageous, particularly when it is desired to remove considerable metal by a single pass of the tool. In this case, at least, a portion of the blade edges may be stepped so that each will remove a proportionate amount of metal and will relay the cutting action to the following blade so as to successively reduce the work. Another advantage in the use of plural blades, is the fact that they may be set so that a revolution mark made by one blade will be reduced by the following blades whereby the final surface of the work will be free of such marks. To accomplish this purpose, the blades should be appropriately spaced and preferably set in accordance with a formula based upon the feed of the tool, speed of rotation of the work and the number of blades used. When the correct spacing is used, it will be found that the successive blades will take cuts so related to the cuts of the preceding blades as to substantially completely remove revolution marks. The formula for determining the correct spacing may be expressed as follows:

$$S = XF + \frac{F}{Y}$$

where S is the spacing of the cutter edges, F is the distance advanced by the cutter for each revolution of the work, X is a constant to insure adequate chip disposal space and Y is the number of blades. F is, of course, determined by dividing the feed of the cutters into inches per minute by the R. P. M. of the work. The illustration of Fig. 3 is based upon work acted upon by eight properly spaced blades. The first blade will cut a series of grooves 20 leaving a peaked ridge, such as shown, between each pair of grooves. The second blade will remove the shaded portion 22 of the ridge while the next blade will remove the portion 21 and so on down, each successive blade taking its successive portion of the ridge until the desired evenness of surface is achieved.

Figure 4:
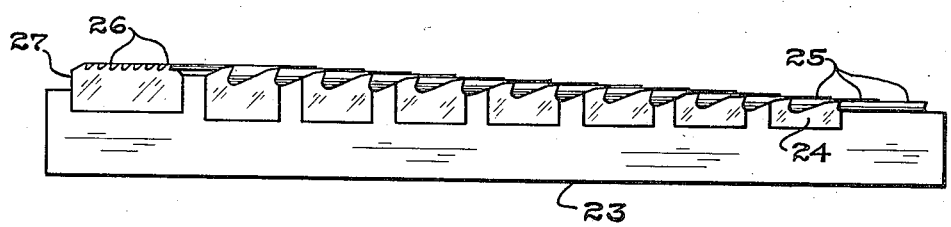
Fig. 4 illustrates one specific form of flat tool embodying the invention.

As an illustration of a complete tool formed in accordance with the invention, reference may be had to Fig. 4, in which the tool includes a base block 23 having mounted therein the blade units 24, each of which may, by way of illustration, be formed in accordance with Fig. 2 and in this case each of the blade edges 25 of these units will extend above the preceding edge on the right to form a whole series of stepped blades, each of which is adapted to remove a given amount of material. By this arrangement a single pass of such a tool across the work may be made to reduce a total amount of material equalling the sum of the steps of the several blades. A set of finishing blade edges 26 may also be mounted in the base 23. They are shown as being formed integral with a finishing blade block 27. The finishing blades are likewise of the character and form shown in Fig. 2, although they may conveniently be of less depth than the blades 25 since they will be called upon to remove only a small amount of metal. They are preferably spaced in accordance with the above formula so that the relay action thereof will result in the removal of all revolution marks. If desired, the blade pieces may be adjustable and may be removably positioned in the base 23 or may be permanently secured therein or formed integral therewith. Obviously, the blade edges may depart from the rectilinear, if desired, so that they may act as contour cutters. The blades may also be set to have their cutting edges lie in a plane or planes at an angle to that of the axis of the work so as to perform taper turning. The blade edges preferably lie across the block at an angle of approximately 35° to its longitudinal axis so that when the block is moved across the work surface transversely to the direction of the work axis, the angle of incidence of the edges will be substantially 55°. As previously indicated, however, this angle may well vary to suit particular circumstances. The angle to the direction of movement of the blade should be kept below 45° (i. e. it should be a minor angle) preferably between 30° and 40° so that the angle of incidence may be major.

The factors upon which depends the production of a smooth finished surface may be summarized as follows:

1. The number of finishing blades employed.
2. The number of revolutions of the work in relation to a given rate of tool feed.
3. The width of blade edge which is effective or active at any given instant.

It will be clear from Fig. 3 and the formula explained in connection with it that the greater the number of finishing blades employed the less will be the burden placed upon each blade and the smoother will be the resulting surface. The ridges formed between successive revolution marks will be more uniformly reduced as the number of blades is increased. Obviously a limit may be reached beyond which the improvement in the smoothnes of the surface due to the use of more blades is so negligible that it is impractical to use more. Ordinarily it will be found unnecessary and undesirable to employ more than eight finishing blades and in many instances a fewer number will be found quite adequate. Again, it will be clear that if a large number of revolutions of the work are permitted for each inch of advance of the cutter, there will be such an overlapping of the revolution marks, or successive cuts, that a smooth surface may be produced by a single blade. The width or length of the section of the blade edge which will be effective at a given time may depend upon several factors. For example, the angle of incidence of the blade to the work has its effect. If the blade is parallel with the work axis the entire blade edge is active at once and theoretically no revolution marks will be formed. As the angle between blade and work axis increases, the width of the active portion at any instant will decrease. This results in a rougher finish but at the same time reduces the load on the machine and cutter and relieves chattering. I have found it preferable to employ a major angle of incidence, as before stated, and to rely upon other factors to provide a work surface of desirable smoothness.

By the use of this type of tool, it is possible to provide maximum tool life, since the burden on each blade may be relieved by the fact that the work is being operated upon by as many roughing cutters as may be required and as many finishing cutters as may be required, all in a single pass of the tool. No one blade will thus be subjected to continuous action or overburdening by too deep a cut. Furthermore, from a single chucking of the work, the tool will operate to both rough and finish the work at a single pass of one tool block.

Figure 5:
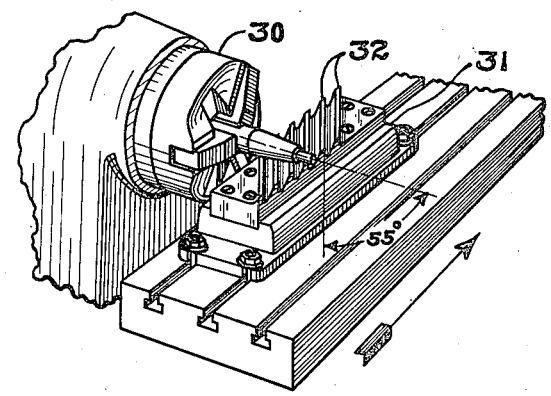
Fig. 5 is a view illustrating the spindle work and tool block relation for carrying out the method while using a tool of the type shown in Fig. 4.

One means of carrying out the method of using a tool of the type shown in Figure 4 is illustrated in Figure 5; a chuck 30 holds the work and rotates it at cutting speed. The tool block 31 is adapted to be moved, rectilinearly, transversely with respect to the axis of rotation of the work. Such movement causes the blades 32 to successively strike the rotating work surfaces, at a tangent thereto, the angle of incidence being preferably about 55°; and the approximate rate of advance of the tool block will depend, to some extent, upon the nature of the work, the material, the size and the form of the article being turned.

As shown in Figure 5, the blades may be arranged so that their edges lie in planes at an angle to the axis of the work so that their cutting action will result in tapering the work piece. While details of the cutter construction are not shown in Figure 5, nor in the succeeding Figures 6, 7 and 8, it will be understood that the blades partake of the characteristics specifically illustrated in Figure 4; that is, the blades are provided with a rake and a clearance angle, and the curving curled surfaces therebetween, and each block preferably includes the step-bladed roughing cutters and the finishing blades of even height.

Figure 6:
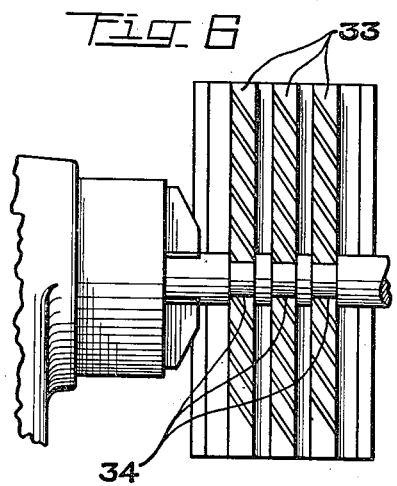
Fig. 6 is a view illustrating a similar structure in which a plurality of spaced tool blocks are used to operate on spaced work surfaces.
Figure 7:
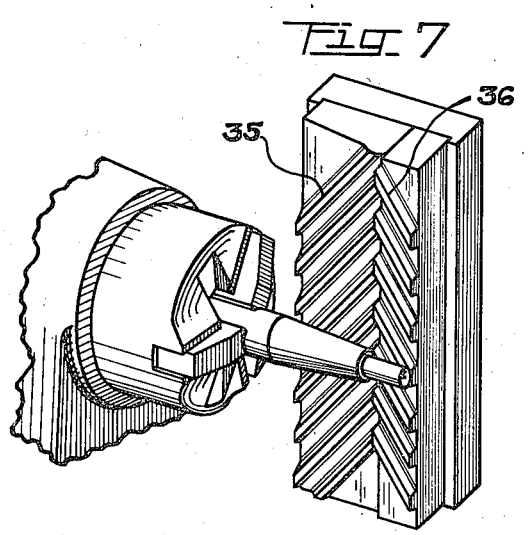
Fig. 7 is a further modification showing the use of blade series having angular disposition of the blade planes so as to form the work in accordance with the angular disposition of the blades.
Figure 8:
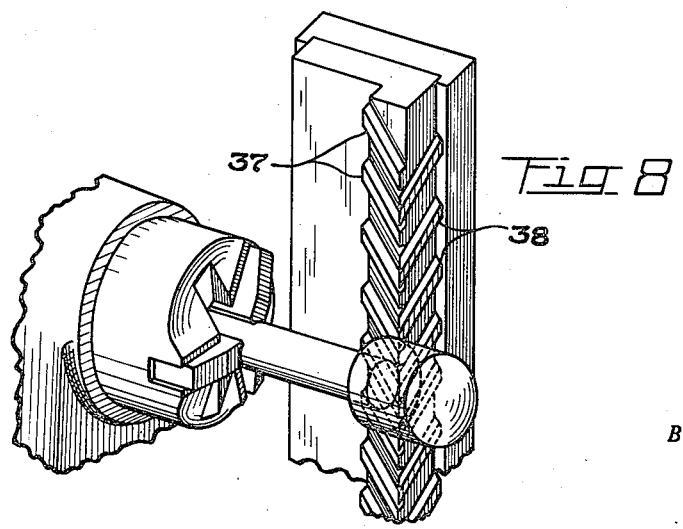
Fig. 8 is a still further modification showing the method and tool used for operating upon right angularly disposed surfaces.

By referring to Figures 6, 7 and 8, it will be seen that the invention is not confined to specific blade arrangements. In Figure 6 is shown means for turning a plurality of spaced surfaces. In this instance, a plurality of sets of blades 33 are arranged to sumultaneously act on the spaced surfaces 34 of the work, each series of blades having the characteristics of the block shown in Figure 4. Such an arrangement is particularly adapted for the turning of spaced surfaces on cam shafts, crank shafts and the spaced surfaces of grooved pistons. Figure 7 illustrates an application of the invention to the turning of adjacent, angularly disposed, surfaces; one set of blades 35 being disposed at an angle to the other set of blades 36 so that in a single pass of the tool, two angularly disposed surfaces are turned.

Figure 8 shows means for turning a surface parallel to the axis of rotation of the work and adjacent, at right angles, to the axis of rotation. Thus, by one tool, having cutters 37 and 38, the cheeks of a flange may be turned together with a surface substantially parallel to the axis of rotation of the work piece.

Further modifications of the tool for turning formed surfaces of irregular configuration may obviously be utilized and the finished work will, of course, take a concentric form parallel to the characteristics of the blade edges, which may be thus formed at angles, or in curves, to conform with the type of the finished surfaces desired.

As a specific means for carrying out those forms of the invention shown in Figures 4 to 8, an apparatus, as disclosed in my co-pending application for Metal working apparatus, filed January 31, 1935, Serial Number 4,208, may be used. This apparatus provides means for rotating the work at cutting speed and for subjecting the work, while rotating, to the action of a reciprocating cutter block having stepped roughing blades and unstepped finishing blades similar to the tool shown in Figures 4 to 8. The apparatus also provides means for maintaining synchronization between the speed of rotation of the work and the speed of reciprocation of the table. It further provides means for varying the rate of synchronization. Obviously, modifications and refinements of the machine, such as automatic operations of the clutch and other appropriate control means, are contemplated.

For carrying out the present method, and for utilizing the present tools in an apparatus in which a plurality of pieces may be simultaneously turned by a continuous operation, the apparatus shown, in Figures 9, 10 and 11, may be used; this apparatus being claimed in the parent application, Serial Number 556,387, entitled Stationary tool metal working apparatus, filed August 11, 1931, of which this is a continuation in part.

Referring more particularly to Figure 9 of the drawings, the numeral 70 represents the base of the machine, the edge 71 of the substantially cylindrical outer wall thereof receiving an annular groove of the carrier 72. The base includes suitable bearing means for the two driving shafts 73 and 74, as well as a support, for the roller bearings 75 for the carrier. A central column 76, forming the upper portion of the base 70, is provided with upper and lower bearing surfaces 77 and 78 respectively, upon which a correspondingly shaped cylindrical portion 79 of the carrier and hub 80 of the spindle drive gear are guided. Upon the upper end of the column 76 is formed a super-frame structure 81 upon which the driving motor 82 is secured for operating the machine. An intermediate shaft 83 is journalled in the frame 81 which receives the drive from the motor 82 as by the belt 84. The shaft 83 carries a bevelled pinion 85 that drives an enmeshing bevelled pinion 86 upon the main driving shaft 73 positioned centrally of the machine and extending vertically through the length of the machine, having an upper bearing 87 in the column and a lower bearing 88 in the base.

The driving shaft 73 actuates both the table, or carrier, drive and the spindle drive by means of a gear 89 that meshes with and drives a gear 90 secured to the short vertical shaft 74 journalled in the base. The shaft 74 is provided with a pinion 91 for engaging the internal annular gear teeth 92 of the spindle drive gear 93, thus turning the spindle gears 103ª.

Upon the lower end portion of this shaft 74 is secured a bevelled pinion 94 that meshes with and drives a similar bevelled pinion mounted upon a shaft (not shown) carrying a wheel 95 which drives, by means 96, a similar wheel 97 upon the shaft 98 which, in turn, drives a worm-shaft 99. The worm 100 on the shaft 99 meshes with and operates the large annular worm-gear 101 formed on the base of the carrier for the purpose of continuously rotating the same. Any suitable means may be provided for engaging, or disengaging, the worm-drive for the purpose of stopping, or starting, the carrier. The table, or carrier, is generally indicated by the numeral 72, its lower portion, as will be seen, is of a considerably larger diameter than the upper portion and, at the point of the difference in the two diameters, there is formed on the carrier, a flange, or table, 102, upon which spindle bearings are mounted to accommodate the spindles 103, which, in turn, carry the work fixtures 104 and the work pieces 105. The work spindles 103 are supported in the flange 102 of the carrier and in the lower bearings 106 formed in the lower portion of the carrier on which the large gear 101 is also formed. The carrier is supported and operates on the bearings 75 and is further guided by the bearing of the cylindrical portion 79 thereof upon the upper bearing surface 77 of the column.

Each of the spindles 103 is provided with a spindle gear 103ª that meshes with and is driven by the spindle drive gear 93, as hereinbefore pointed out. In order that the work spindles 103 may be brought to a position of rest with respect to rotation on their own axes when they come to the loading station, automatic means are provided for disconnecting the drive to the spindles. Such means may consist of a fixed cam 107 on the framework of the base, which successively engages gear moving means 107a for the gears 103a, thus successively lifting the same out of engagement with the gear 93 as the spindle is passing the loading station.

The structure of the machine also includes a circular series of external braces, or supports, 108, the upper ends of which are united by a spider 109 which forms an external bearing for the upwardly extending columnar portion of the carrier. The tools, or cutting blades, 110 may be supported on a circular base 111 carried upon the braces 108 or, if desired, a circular series of externally facing blades 112 may be mounted internally of the work orbit, as shown in Figure 12. Obviously the invention contemplates either one, or the other, or both arrangements for the blades. In addition thereto, it is obvious that the blade edges may, in some instances, extend across the orbital path in the horizontal plane indicated at 114 in Figure 12. As therein to be noted, the blades may extend over and/or under the work whereby the upper, or lower, surface of the work may be turned together with a reduction, or finishing, of the side surface.

In the operation of the machine, the carrier is continuously rotated and, as each spindle arrives at the loading station, or open space at the ends of the circularly arranged blades, the cam operates to disengage the spindle so that the work thereon may be removed and a new piece of work chucked thereon. The carrier continues to move whereby the rotating work moves orbitally to pass across the face of the blades so that each blade successively operates on the surface of the work, the cutting action being relayed from one blade to the next and the cutting action for any blade will pass along the blade edge so that no one blade point will be subjected to continuous strain and heat due to continuous cutting action thereby. The circular series of blades may include a series of stepped blades, each of which has a blade edge positioned further toward the axis of the work than the next preceding blade so that each blade will act to perform an individual reducing cut on the work. The blade edges may, of course, depart from their rectilinear plane and may thus perform forming cuts whereby finished work will have a contour in conformance with the form of the blades.

From the foregoing it will be seen that the present invention fully sets forth a novel method and tool. Another form of the method of the invention is set forth in my patent, No. 1,899,608, issued February 28, 1933, and claimed therein; such method, however, coming within the broad scope of some of the method claims hereof. Other apparatuses and tools also form the subject matter of other applications. The invention is, therefore, not confined to the specific structure shown herein by way of illustration; nor are the claims hereof limited since numerous changes and modifications, and the full use of equivalents, may be resorted to without departure from the spirit or scope of the invention as outlined therein.

Having thus set forth the nature of my invention, what I claim is:

1. A method of working metal which includes the steps of subjecting a rotating work piece to the successive actions of a plurality of stepped roughing blades and a plurality of unstepped finishing blades by a single continuous movement of a tool.

2. A method of working metal which includes a step of rotating a piece of work and producing relative movement between a cutter and the work for subjecting its surface, while rotating, to the successive action of a plurality of stepped cutting edges, each of which will reduce the surface a proportionate amount and in a continuation of the same relative movement subjecting the surface to the action of a plurality of finishing blades.

3. A method of working metal which includes the step of subjecting a rotating work piece surface to the progressive action of an elongated cutting edge disposed at a major angle with respect to the work axis.

4. A method of working metal which includes the step of subjecting a rotating work surface to the successive tangential shearing action of a plurality of cutting edges disposed at major angles to the axis of the work.

5. A method of working metal which includes the step of subjecting a rotating work surface to the successive tangential shearing action of a plurality of stepped cutting edges disposed at major angles to the work axis.

6. A method of working metal which includes the steps of rotating the work, passing a series of stepped blades, each disposed at a major angle with respect to the axis of rotation of the work, tangentially of the work by a movement thereof in a direction transversely of the axis of the work whereby the work will be operated upon by the blades to perform a series of skiving cuts.

7. A method of turning metal which comprises producing a relative rotative movement between a work piece and an elongated cutting edge at a cutting speed and simultaneously by a separate movement advancing the cutting edge relatively across the face of the work to shift the cutting action along said edge, and maintaining the edge at a minor angle to the direction of said advance.

8. A method of turning cylindrical work surfaces which includes the step of subjecting the surfaces, while rotating, to the action of individual blades, each of which forms a spiral cut on the work surfaces; the convolutions produced by one blade being out of step with the convolutions formed by another blade so as to reduce revolution marks left thereby.

9. A method of turning cylindrical work surfaces which includes the step of subjecting the surfaces, while rotating, to the action of individual blades, each of which forms a spiral cut on the work surfaces; the convolutions produced by one blade being out of step with the convolutions formed by another blade so as to reduce revolution marks left thereby; the spacing of the blades being such as to produce the out of step convolutions without variations in the rate of movement of the blades with respect to the rotation of the work.

10. A method of turning cylindrical surfaces which includes the step of subjecting the surfaces to the action of individual blades each of which will cut a successively deeper spiral upon the work surfaces; the convolutions of each spiral overlapping to produce a substantially uniform reduction of the surface for each blade and by the same movement of a tool subjecting the work to the action of cutters which will form spirals of uniform depth in the work; the spirals being out of step so as to remove revolution marks thereby.

11. A method of turning metal to produce a finished surface which includes the step of rotating he work at cutting speeds and subjecting the work, while rotating, to the action of a series of stepped cutting blades each of which moves relative to the work in a circular path internally tangent to the surface of the work.

12. The method of working metal which comprises supporting a work piece adjacent a cutter having helically arranged cutting edges, rotating the work piece at cutting speed, and moving the work piece with reference to the cutter to effect a feeding movement between the work piece and the cutter.

13. The method of working metal which comprises supporting a work piece adjacent a cutter having helically arranged cutting edges, rotating the work piece at cutting speed, and moving the axis of the work piece with reference to the cutter to effect a feeding movement between the work piece and the cutter.

14. The method of working metal which comprises supporting a work piece adjacent a spiral cutter having helically arranged cutting edges, rotating the work piece at cutting speed, and moving the work piece in an arcuate path to effect a feeding movement between the work piece and the cutter.

15. The method of working metal which comprises supporting a work piece adjacent a spiral cutter having helically arranged cutting edges, rotating the work piece at cutting speed, and moving the axis of rotation of the work piece about the axis of the spiral to effect a feeding movement between the work piece and the cutter.

16. The method of working metal which comprises supporting a plurality of work pieces adjacent a spiral cutter having helically arranged cutting edges, rotating the work pieces at cutting speed, and moving the axis of rotation of the work pieces about the axis of the spiral whereby the work pieces necessarily engage the cutter.

17. A metal working, turning tool including a base having a plurality of stepped, elongated cutting edges thereon arranged at an angle thereacross of less than 45° to the longitudinal axis of the tool and each including a rake angle.

18. A metal working turning tool including a base having a plurality of elongated cutting edges thereon arranged at an acute angle thereacross and each including a clearance angle.

19. A metal working, turning tool including a base having a plurality of cutting edges thereon arranged at an acute angle thereacross and each including a rake angle and a clearance angle.

20. A metal working, turning tool including a base, a plurality of stepped cutting edges on said base and arranged thereacross at a major angle to a line drawn transversely across the surface of the base.

21. A metal working tool including a plurality of blades spaced apart in accordance with the formula $$S = XF + \frac{F}{Y}$$

when S is the spacing, X is a constant, F is the tool feed and Y is the number of blades.

22. A metal working cutter for turning machines, and the like, which comprises a base, a series of stepped cutting edges carried by said base, rake and clearance surfaces adjacent each of said cutting edges and a gently curved surface connecting the rake surface adjacent one edge with the clearance surface adjacent another edge.

23. A metal working tool for turning machines, and the like, including a body having a series of roughing blades and a series of finishing blades arranged to successively engage a work piece, said blades having their edges helically arranged with respect to the axis of the body.

24. A metal working tool comprising a circular series of stepped cutting blades and a circular series of unstepped finishing blades all of said blades extending at an angle to the axis of the tool.

25. A metal working tool comprising a base, a plurality of helical blades mounted on said base and extending different radial distances from its axis, the farthest extending blade edge in any transverse plane to the base being a radial distance from the axis greater than any portion of the base lying in the same plane.

26. A metal working tool comprising a base, a plurality of helical blades mounted on the base and extending different radial distances from its axis, all of said blade edges in any transverse plane through the body being disposed a radial distance from the axis greater than any portion of the base which lies in the same plane.

27. A metal working tool comprising an annular body, a plurality of blades carried by the body, said blades forming blade edges constituting a series of radially stepped edges and a series of radially non-stepped blades.

28. A metal working tool comprising an annular body, blades carried by said body and extending inwardly thereof, elongated blade edges formed on said blades, said edges being disposed in a spiral plane with respect to the axis of the body.

29. A metal working tool comprising an annular body, blades carried by said body and extending inwardly thereof, blade edges formed on said blades, said edges forming a series of radially stepped blades and, at least, two blades which are not stepped with respect to each other.

30. A metal working tool including a base, blades carried by said base, helically disposed blade edges formed on said blades including roughing blades and, at least, two finishing blade edges, the edge of each succeeding roughing blade being arranged to be farther from the axis of the tool so that the curve formed by the intersection of the edges with a transverse plane would be a spiral and the blade edges further disposed so that the curve formed by the intersection of a longitudinal plane with helically disposed blades upon rotation will be the shape desired for this work.

31. A metal working tool including an annular base, blades carried by said base, helically disposed blade edges formed on said blades, the edge of each succeeding blade being arranged to be nearer the axis of the tool so that the curve formed by the intersection of the blade edges with a transverse plane through the body would be a spiral and the blade edges being further disposed so that the figure formed by the intersection of the edges with a longitudinal plane upon rotation of the tool would be the shape desired for the finished surface of the work.

32. In a cutting tool of the shearing type, for turning machines, or the like, the combination with a base of a plurality of spaced cutting edges, arranged at an angle across the base for feed at an angle with respect to the work, each cutting edge having a contiguous, substantially circular curling surface.

33. A metal working cutter for turning machines, and the like, which comprises a base and a series of similar cutting edges disposed at an angle across the base, said edges being so arranged that each will cut a different spiral path around the work surface.

34. A metal working cutter for turning machines, and the like, which comprises a base and a series of similar cutting edges disposed at an angle across the base, said edges being so arranged that they will cut different but overlapping paths around the work surface.

35. In a cutting tool of the shearing type for turning machines, or the like, the combination with a base of a plurality of spaced cutting edges, arranged at an angle across the face of the base for feeding at an angle with respect to the work, each cutting edge having a clearance angle, a rake angle and a contiguous, substantially circular curling surface.

36. A method of working metal which includes the steps of subjecting a rotating work piece to the successive actions of a plurality of stepped roughing blades and a plurality of unstepped finishing blades by a single continuous relative movement between work and tool.

37. A method of working metal which includes a step of rotating a work piece and producing relative movement between a cutter and the work for subjecting its surface, while rotating, to the successive action of a plurality of stepped cutting edges, each of which will produce angular spaced overlapping surface cuts convex to the axis of the work and in a continuation of the same relative movement subjecting the surface to the action of a plurality of similarly acting non-stepped finishing blades.

38. The method of forming a surface revolution on a piece of work comprising rotating the work and subjecting it, while rotating, by relative bodily movement between the work and a tool, to the action of a series of stepped, angularly disposed, metal cutting teeth which act substantially tangentially of the surface of the work, the spacing of the teeth and the rotating of the work being predetermined to effect successive overlapping cuts convex to the axis of the surface of the revolution and by a continuation of the same relative movement subjecting the rotating surface to the action of a series of similarly acting non-stepped cutting edges.

39. A method of turning metal to produce a finishing surface which includes the step of rotating the work at cutting speeds and subjecting the work, while rotating, to the action of a series of stepped cutting blades, each of which has relative movement with respect to the work tangent to the path of such relative movement.

40. The method of cutting material to a predetermined circumferential shape and size by use of a series of cutting tools, comprising rotating the work piece body a predetermined number of revolutions per minute and simultaneously moving the axis of rotation of the body at a predetermined rate of speed relative to the cutting tools, while maintaining the tools spaced apart at predetermined distances from each other to thereby effect a series of angularly displaced overlapping surface cuts, the curvatures of which are convex to the axis of a cylinder.

41. The method of forming a surface of revolution on a piece of work, comprising arranging a series of metal cutting tool teeth substantially tangentially to the path of movement of the work piece with the spacing thereof predetermined to effect successive overlapping cuts forming a series of curved surfaces convex to the axis of the surface of revolution, and effecting a single relative movement between the work piece and all of the cutting edges of the tool teeth while rotating the body of the work piece a predetermined number of revolutions per minute and while simultaneously moving the axis of rotation of the body of the work piece at a predetermined rate of speed relative to the tool teeth.

EDWARD C. BULLARD.